United States Patent
Howard et al.

(10) Patent No.: US 7,409,563 B2
(45) Date of Patent: Aug. 5, 2008

(54) METHOD AND APPARATUS FOR PREVENTING UN-AUTHORIZED ATTACHMENT OF COMPUTER PERIPHERALS

(75) Inventors: Robert James Howard, Clifton, VA (US); Stanley Reid, Manassas, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 840 days.

(21) Appl. No.: 10/625,108

(22) Filed: Jul. 22, 2003

(65) Prior Publication Data
US 2005/0021996 A1    Jan. 27, 2005

(51) Int. Cl.
*G06F 21/04*    (2006.01)

(52) U.S. Cl. ............... 713/194; 713/1; 726/34; 710/8; 710/104; 439/147

(58) Field of Classification Search ........ 713/1, 713/153, 194; 726/34; 710/15, 28, 200, 710/8, 104; 439/70, 133, 147, 154, 681
See application file for complete search history.

(56) References Cited

U.S. PATENT DOCUMENTS

| | | | | |
|---|---|---|---|---|
| 3,611,274 A | * | 10/1971 | Low et al. ............ | 439/163 |
| 5,202,997 A | * | 4/1993 | Arato ................. | 726/34 |
| 5,299,314 A | * | 3/1994 | Gates ................. | 710/64 |
| 5,386,567 A | * | 1/1995 | Lien et al. ........... | 713/100 |
| 5,434,562 A | | 7/1995 | Reardon | |
| 5,483,596 A | * | 1/1996 | Rosenow et al. ....... | 713/167 |
| 5,878,210 A | | 3/1999 | Kong | |
| 5,889,866 A | | 3/1999 | Cyras et al. | |
| 6,009,527 A | * | 12/1999 | Traw et al. ........... | 726/15 |
| 6,032,257 A | * | 2/2000 | Olarig et al. ......... | 726/35 |
| 6,212,635 B1 | | 4/2001 | Reardon | |
| 6,233,685 B1 | | 5/2001 | Smith et al. | |
| 6,240,477 B1 | * | 5/2001 | Erkinger et al. ....... | 710/110 |
| 6,357,007 B1 | | 3/2002 | Cromer et al. | |
| 6,360,321 B1 | | 3/2002 | Gressel et al. | |
| 6,412,070 B1 | | 6/2002 | Van Dyke et al. | |
| 6,463,540 B1 | | 10/2002 | Lelong et al. | |
| 6,754,826 B1 | * | 6/2004 | Challener et al. ...... | 713/182 |
| 6,821,159 B2 | * | 11/2004 | Munger et al. ........ | 439/680 |
| 6,839,776 B2 | * | 1/2005 | Kaysen ............... | 710/36 |
| 2004/0098604 A1 | * | 5/2004 | Noldge ............... | 713/193 |

* cited by examiner

*Primary Examiner*—Emmanuel L Moise
*Assistant Examiner*—Paul Callahan
(74) *Attorney, Agent, or Firm*—DeMont & Breyer LLC

(57) ABSTRACT

A technique is disclosed for preventing un-authorized attachment of computer peripherals to a computer or computer network. Illustrative embodiments comprise two mating keyed-adapters between network/host computer ports and peripheral ports. One or both adapters can contain hardware for enabling and disabling communications to and from peripherals under software control from a host computer. The peripheral-side adapter contains a first hardware for storing a unique identifier corresponding to the attached peripheral. The host computer retrieves this stored identifier and compares it to a database of authorized identifiers. If a match is found, then communication to and from the peripheral is enabled either in a second hardware within the adapter or software within the host computer. If a match is not found, then communication to and from the peripheral is not permitted.

29 Claims, 17 Drawing Sheets

US 7,409,563 B2

METHOD AND APPARATUS FOR PREVENTING UN-AUTHORIZED ATTACHMENT OF COMPUTER PERIPHERALS

FIELD OF THE INVENTION

The present invention relates to computers in general, and, more particularly, to preventing un-authorized attachment of computer peripherals to a computer or computer network.

BACKGROUND OF THE INVENTION

FIG. 1 depicts block diagram of a portion of a typical computer network in the prior art. Computer network 102 comprises computer network bus 104 to which computer peripherals can be attached or shared across the network. In particular, host computer 106 via computer port 108 is attached to computer network bus 104 via computer network port 110. Peripheral 118 is directly connected to the computer network via peripheral port 120 and computer network port 122. Alternatively, peripheral 114 is directly connected to host computer 106 via peripheral port 116 and host computer port 112.

If such a network is a classified network, provision must be made to track configuration changes, particularly the un-authorized attachment of computer peripherals. If this is not done, then un-authorized data and "viruses" residing in software/firmware contained within computer peripherals attached to a host computer or computer network can reap havoc upon the computer or network or both. The expense and time required to track configuration changes manually is high. Manual tracking often leads to long delays and waits when changes must be made in a classified development environment.

Automated configuration control and logging of attachments of computer peripherals is superior to manual tracking. The prior art, however, concentrates primarily on enhanced automated software protection of computer assets. In U.S. Pat. Nos. 5,144,659 and 5,289,540, Jones discloses a security method wherein a hard drive controller provides extra security functions. In U.S. Pat. No. 5,434,562, Reardon discloses the use of CPU-independent, user activated key lock switches by which a CPU-independent security controller can be configured and reprogrammed in a secure fashion.

SUMMARY OF THE INVENTION

The illustrative embodiments of the present invention address the problem of un-authorized attachment of computer peripherals to a computer network/host computer. Common to the illustrative embodiments are two, mating, keyed-adapters that couple the host computer or computer network to the peripheral. In some embodiments, one of the keyed-adapters contains hardware that a host computer accesses to retrieve a unique identifier from the adapter associated with the attached peripheral. Software residing in the host computer will attempt to match the unique identifier to a list of authorized identifiers. If no match is found, then either software residing within the host computer or hardware within one or the other adapter under software control prevents communication to or from the attached peripheral.

In the first illustrative embodiment, the adapters are passive.

In the second illustrative embodiment, the peripheral-side adapter contains hardware for storing a unique identifier corresponding to the attached peripheral. The host computer/processor retrieves this stored identifier and compares it to a list of authorized identifiers. If a match is found, then communication is enabled in software so that software processes can communicate with the peripheral. If a match is not found, then, by default, communication to and from the peripheral is not allowed. Software also resides in the host computer/processor to log mismatches and to notify security personnel or a system administrator of the attempt to attach the unauthorized peripheral.

The third illustrative embodiment contains all the functionality of the second illustrative embodiment, except that control of communications to and from the peripheral is via a second hardware contained within the peripheral-side adapter under software control.

In the fourth illustrative embodiment, communication is initially enabled by a second hardware contained within the host computer/processor/network-side adapter under software control. If a match of an identifier stored in a first hardware within the peripheral-side adapter is not found in the database stored in memory on the host computer, then the second hardware is directed to disable communications to and from the peripheral.

The illustrative embodiment comprises: a first adapter, wherein the first adapter contains hardware for storing a unique identifier; a second adapter, wherein the first adapter couples a first port associated with a computer peripheral to the second adapter, and wherein the second adapter couples the first adapter to a second port associated with a processor; a first software module associated with the processor, wherein the first software module consults a list of identifiers within the first software module and wherein each of the identifiers is associated with a respective computer peripheral authorized for use with the processor; and, means for enabling communication to and from the computer peripheral under control of the processor.

DETAILED DESCRIPTION

Figure 1:
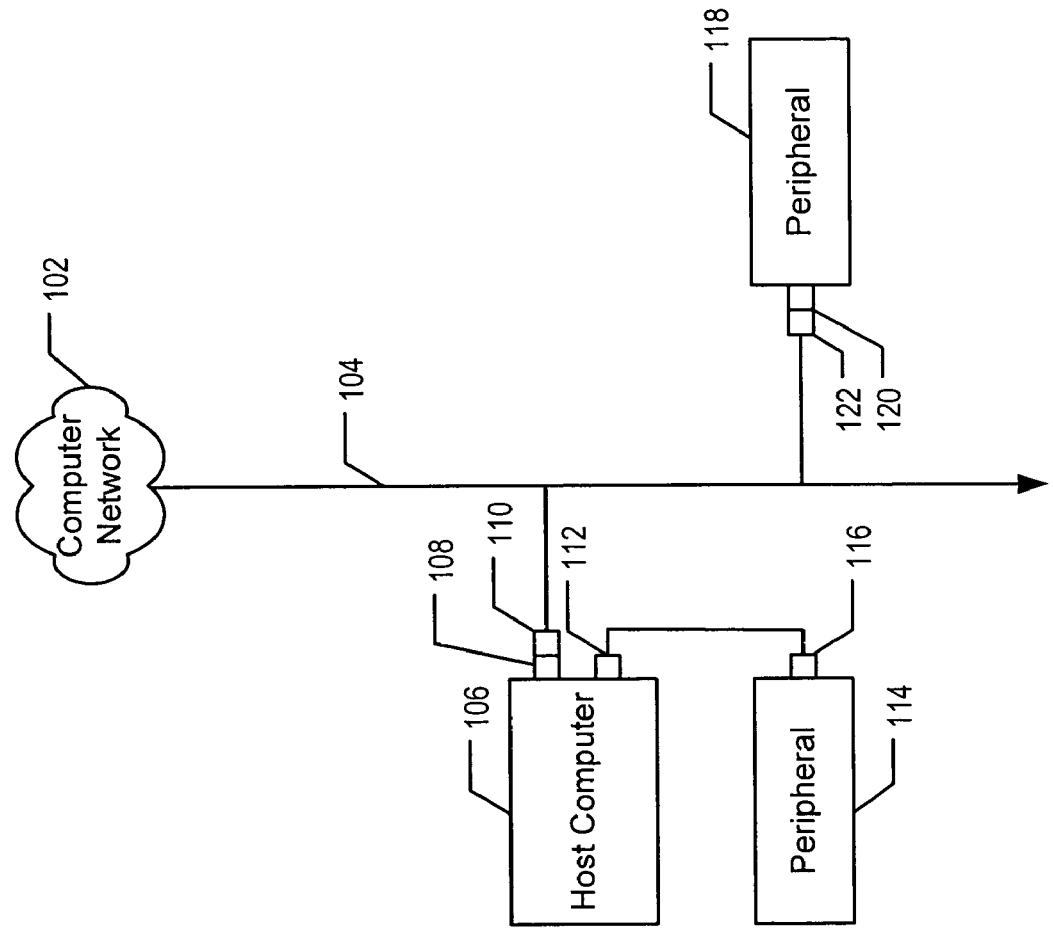
FIG. 1 depicts block diagram of a portion of a typical computer network in the prior art.
Figure 2:
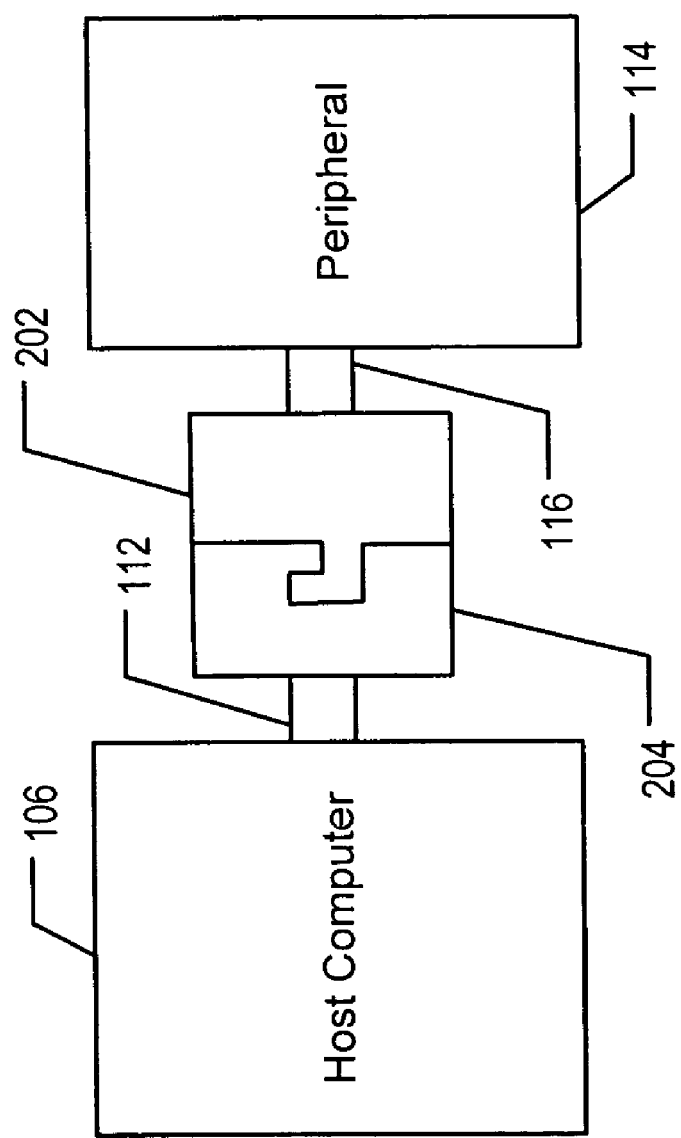
FIG. 2 depicts a block diagram of the use of the illustrative embodiments of the present invention for the case of attaching a peripheral device directly to a host computer port.

FIG. 2 depicts a block diagram of the use of the illustrative embodiments of the present invention for the case of attaching a peripheral device directly to a host computer port. Host computer 106 is attached to adapter 204 via host computer port 112. Adapter 202 is attached to peripheral device 114 via peripheral port 116. Adapter 202 mates with adapter 204. At least one of adapters 202 and 204 is permanently attached to its host (i.e., 202 to peripheral 114 or 204 to host computer 106).

Figure 3:
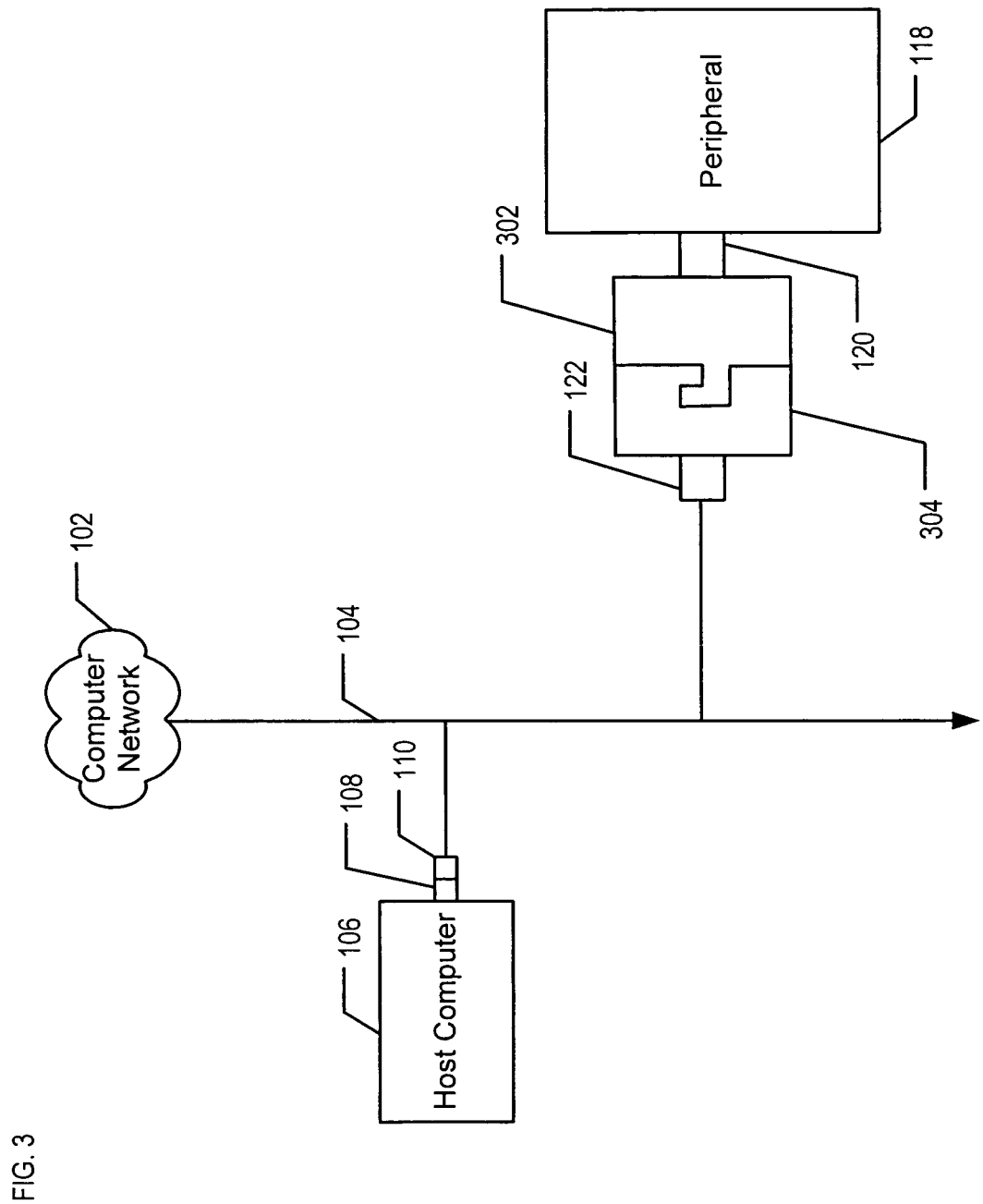
FIG. 3 depicts a block diagram of the use of illustrative embodiments of the present invention for the case of attaching a peripheral device to a computer network port.

FIG. 3 depicts a block diagram of the use of illustrative embodiments of the present invention for the case of attaching a peripheral device to a computer network port. Computer network 102 is connected via network bus 104 to various computer assets. The network is associated with host computer 106 via host computer port 108 and network port 110. Peripheral 118 is attached to adapter 302 via peripheral port 120. Adapter 304 of mates with adapter 302 and is attached to computer network bus 104 via network port 122. At least one of adapters 302 and is permanently attached to its host (i.e., 302 to peripheral 114 or 304 to host computer 106).

Figure 4:
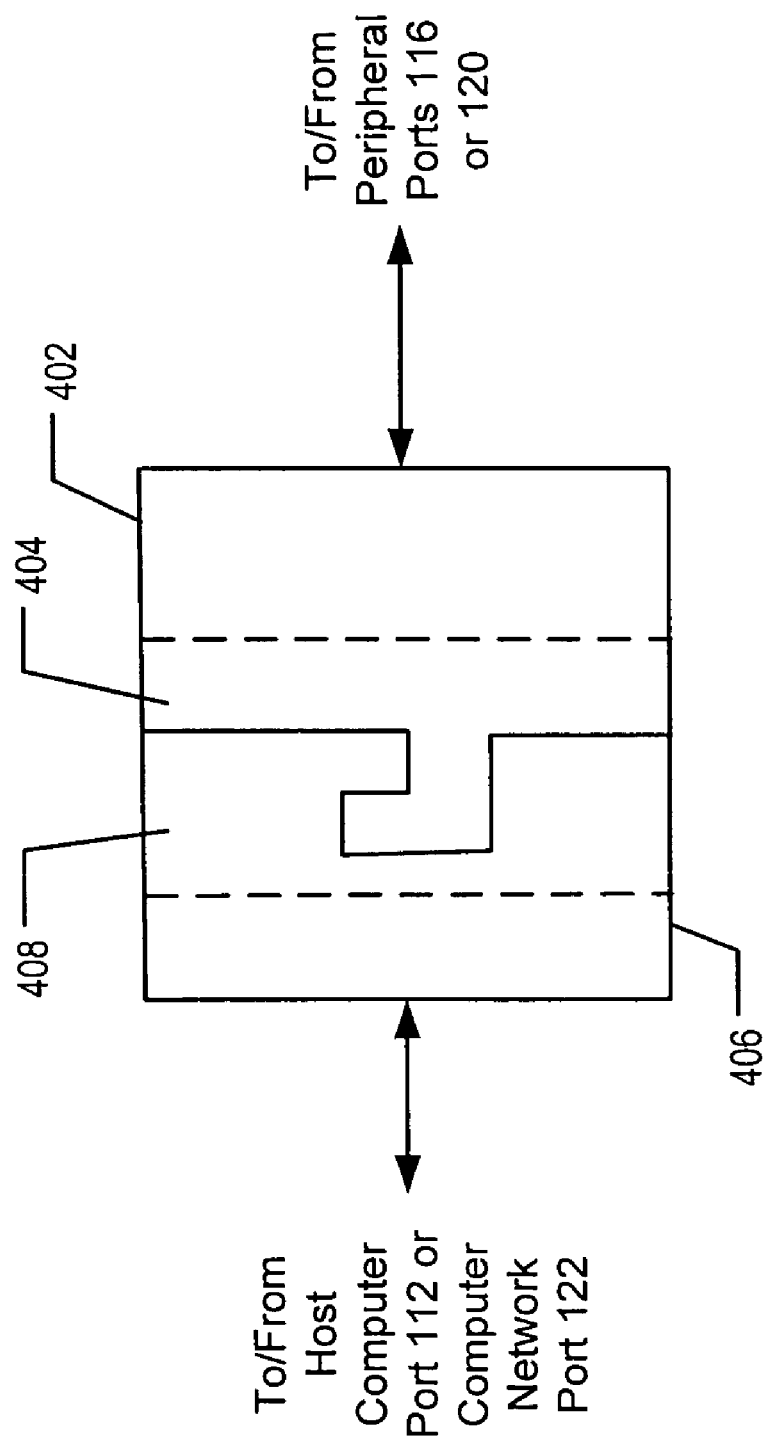
FIG. 4 depicts a block diagram of the first illustrative embodiment of the present invention.

FIG. 4 depicts a block diagram of the first illustrative embodiment of the present invention. Adapter 402 comprises connector 404 which is keyed to connector 408 of adapter 406. In the first embodiment, the adapters are passive; in some other embodiments, one or both adapters 402 and 406 contain electronic and/or mechanical hardware. The amount of unique identifiers required depends on the number of peripherals attached (or could be attached) to host computer 106 or computer network 102 and also depends on the size of the network or the needs of the company using the equipment or both. In some cases, each peripheral will have a unique identifier. In other cases, one unique identifier per peripheral type (per printer type, modem type, etc.), or single identifier for one computer or network or both is all that is required. In still other cases, all that is required is one identifier for all products manufactured by the company.

Figure 5A:
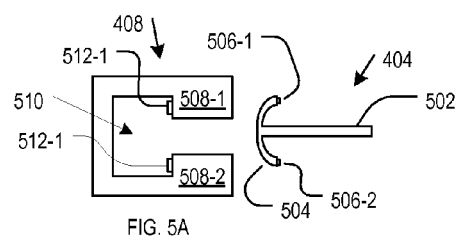
FIG. 5 depicts keyed-connectors 404 and 408 comprising a tamper-proof seal.

FIG. 5 depicts keyed-connectors 404 and 408 comprising a tamper-proof seal. As shown in FIG. 5a, keyed-connector 404 comprises shaft 502, head 504, and electrical contacts 506-1 and 506-2, forming a male keyed-connector. Keyed-connector 408 comprises constriction members 508-1 and 508-2, receiving region 510, and electrical contacts 512-1 and 512-2, forming a female keyed-connector.

Figure 5B:
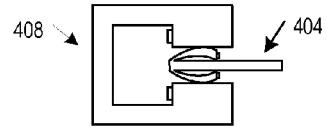
Figure 5C:
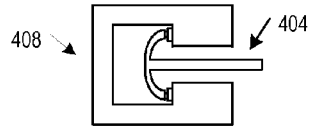

FIGS. 5b and 5c illustrate the use of keyed-connectors 404 and 408. As depicted in FIG. 5b, keyed-connector 404 slides between constriction members 508-1 and 508-2, compressing head 504 to fit in the intervening space. In FIG. 5c, head 504 has entered receiving region 510, expanding back to its original shape. Electrical contacts 506-1 contacts electrical contact 512-1, while electrical contact 506-2 contacts electrical contact 512-2. If an attempt is made to remove keyed-connector 404 from keyed-connector 408, the shape of head 504 initially prevents removal. If significant force is applied, however, head 504 will break, destroying keyed-connector 404 and revealing evidence of tampering.

Figure 6:
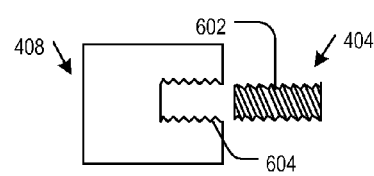
FIG. 6 depicts keyed-connectors 404 and 408 comprising a screw head.

FIG. 6 depicts keyed-connectors 404 and 408 comprising a screw head. Keyed-connector 404 is a male connector comprising threaded-head 602. Threaded-head 602 screws into grooves 604 of female keyed-connector 408.

Figure 7A:
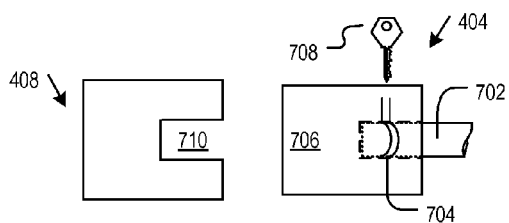
FIG. 7 depicts keyed-connectors 404 and 408 comprising a physical key.
Figure 7B:
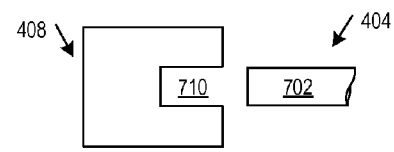

FIG. 7 depicts keyed-connectors 404 and 408 comprising a physical key. As shown in FIG. 7a, male keyed-connector 404 comprises shaft 702, locking mechanism 704, blocking element 706, and key 708. Female keyed-connector 408 comprises receiving region 710. Initially, blocking element 706 surrounds shaft 702 and is locked to shaft 702 via locking mechanism 704. In this initial state, keyed-connector 404 cannot be inserted into keyed-connector 408. When key 708 is inserted and turned in blocking element 706 and locking mechanism 704, blocking element 706 can be removed from shaft 702. As shown in FIG. 7b, shaft 702 can subsequently be inserted into receiving region 710.

Figure 8:
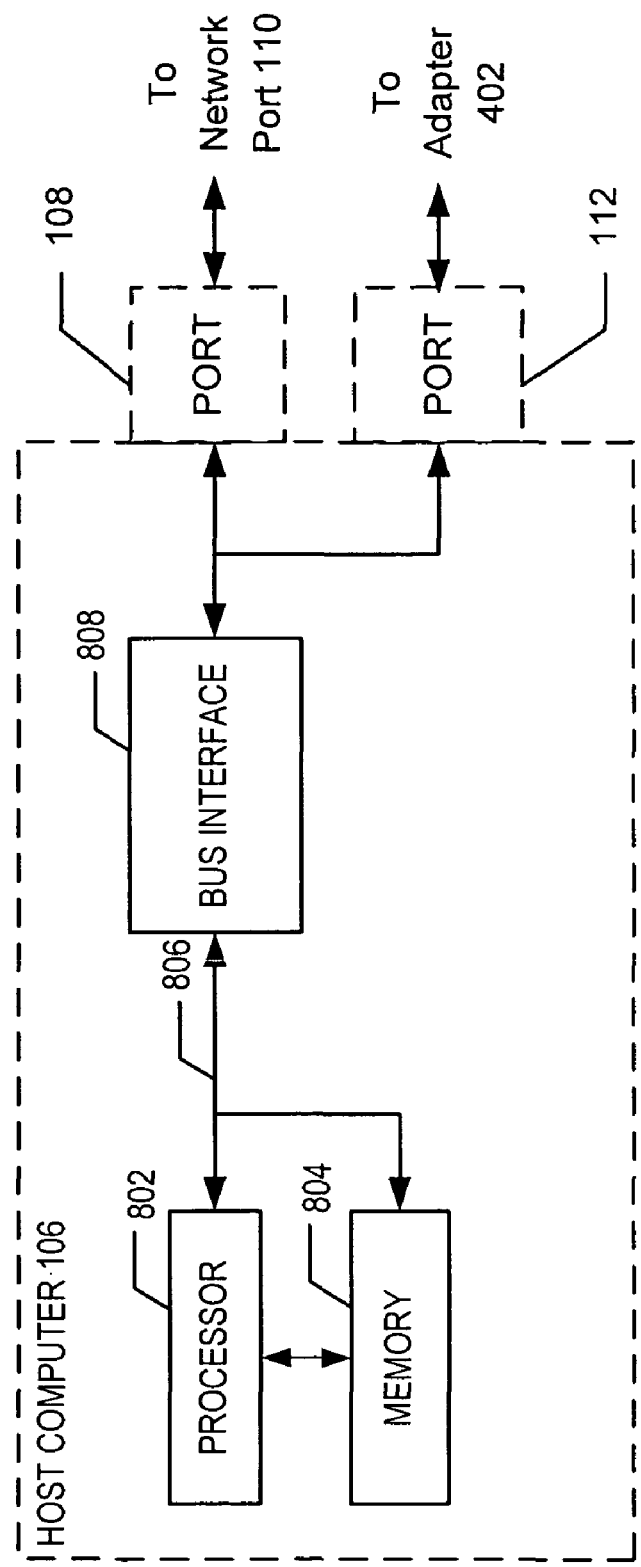
FIG. 8 depicts a block diagram of host computer 106.

FIG. 8 depicts a block diagram of host computer 106. Host computer 106 comprises processor 802, memory 804, host computer bus 806, bus interface 808, host computer port 108, and host computer port 112, interconnected as shown. Processor 802 is a general-purpose or special-purpose processor that is capable of performing the functionality described below and with respect to FIGS. 10 through 13, 15, 16, 18, and 19. In particular, processor 802 is capable of storing data into memory 804, retrieving data from memory 804, executing programs stored in memory 804, and receiving, transmitting, and controlling bus interface 808 using host computer bus 806. Incoming and outgoing messages are communicated via ports 108 and 112, bus interface 808, and host computer bus 806. It will be clear to those skilled in the art how to make and use processor 802, memory 804, host computer bus 806, bus interface 808, host computer port 108, and host computer port 112.

Figure 9:
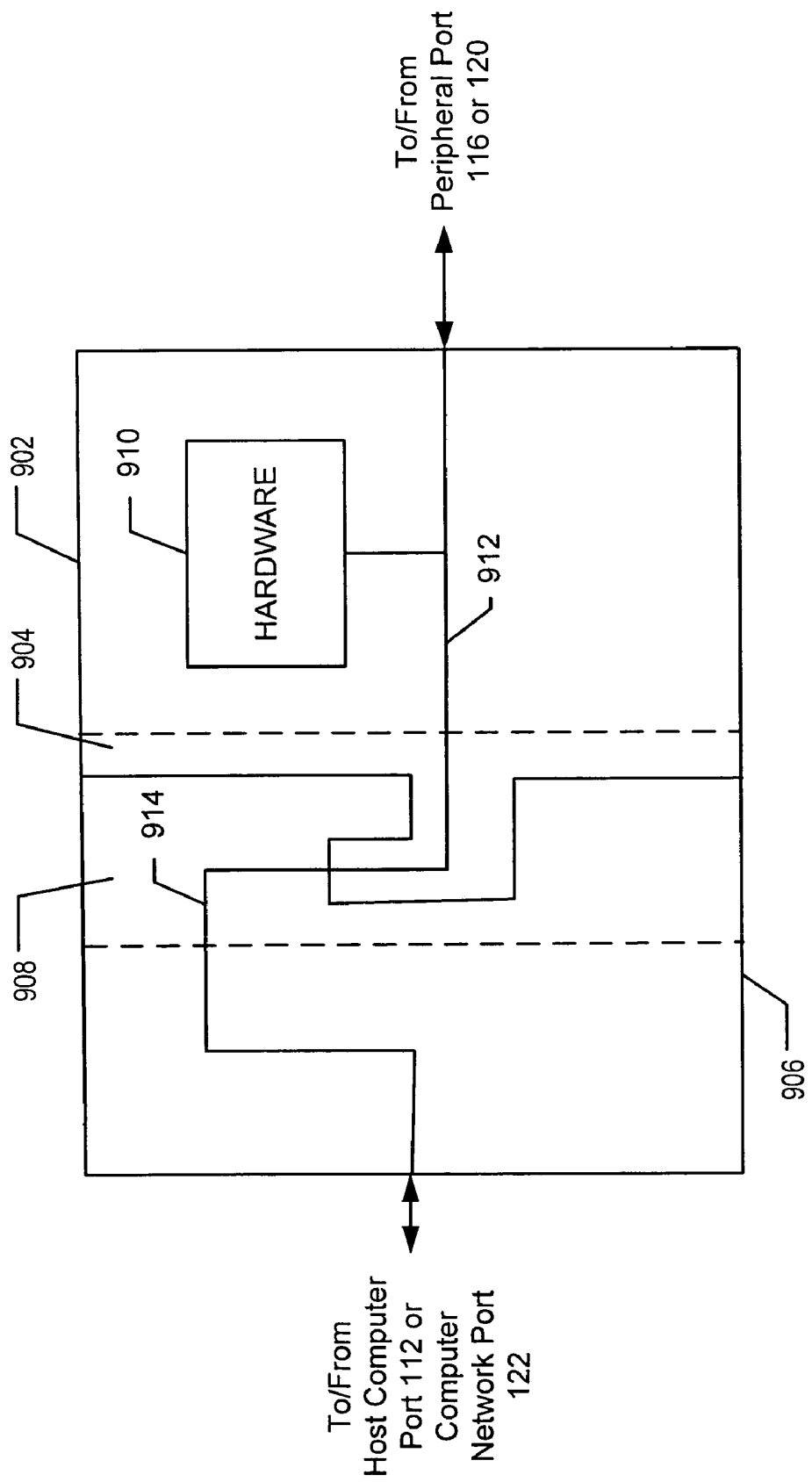
FIG. 9 depicts a block diagram of the second illustrative embodiment of the present invention.

FIG. 9 depicts a block diagram of the second illustrative embodiment of the present invention. The peripheral-side adapter 902 contains hardware 910 for storing, via peripheral ports 116 or 120, a unique identifier for the peripheral with which the adapter is associated. In some embodiments, hardware 910 comprises a memory and supporting hardware. The unique identifier can comprise, without limitation, a serial number, or a serial number and peripheral type. It will be appreciated by those skilled in the art that the unique identifier is not limited to a serial number and peripheral type.

Paths 912 and 914 provide the electrical connections between:

(i) peripheral port 116 and host computer port 112 or
(ii) peripheral port 120 and computer network port 122 via connectors 904 and 908, respectively. Path 912 and 914 permit processor 802 to access the contents of hardware 910.

Figure 10:
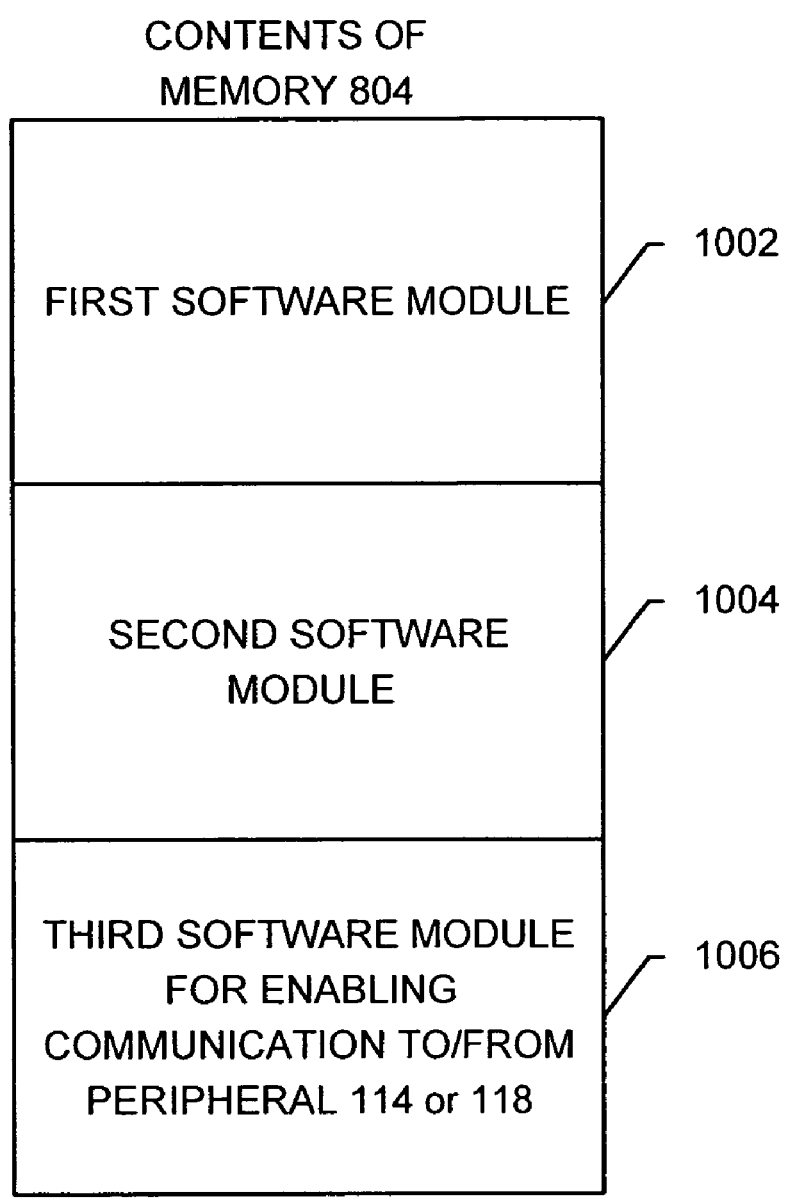
FIG. 10 depicts the contents of memory 804 for the second illustrative embodiment of the present invention.

FIG. 10 depicts the contents of memory 804 for the second illustrative embodiment of the present invention. In the second illustrative embodiment, memory 804 contains:

(1) first software module 1002 comprising a list of identifiers associated with the peripherals that are authorized to connect to host computer 106 or computer network 102;

(2) second software module 1004 for retrieving the contents of first hardware 910 and performing one or more actions based upon said contents; and, (3) third software module 1006 for enabling communication to/from peripheral 114 or 118.

Figure 11:
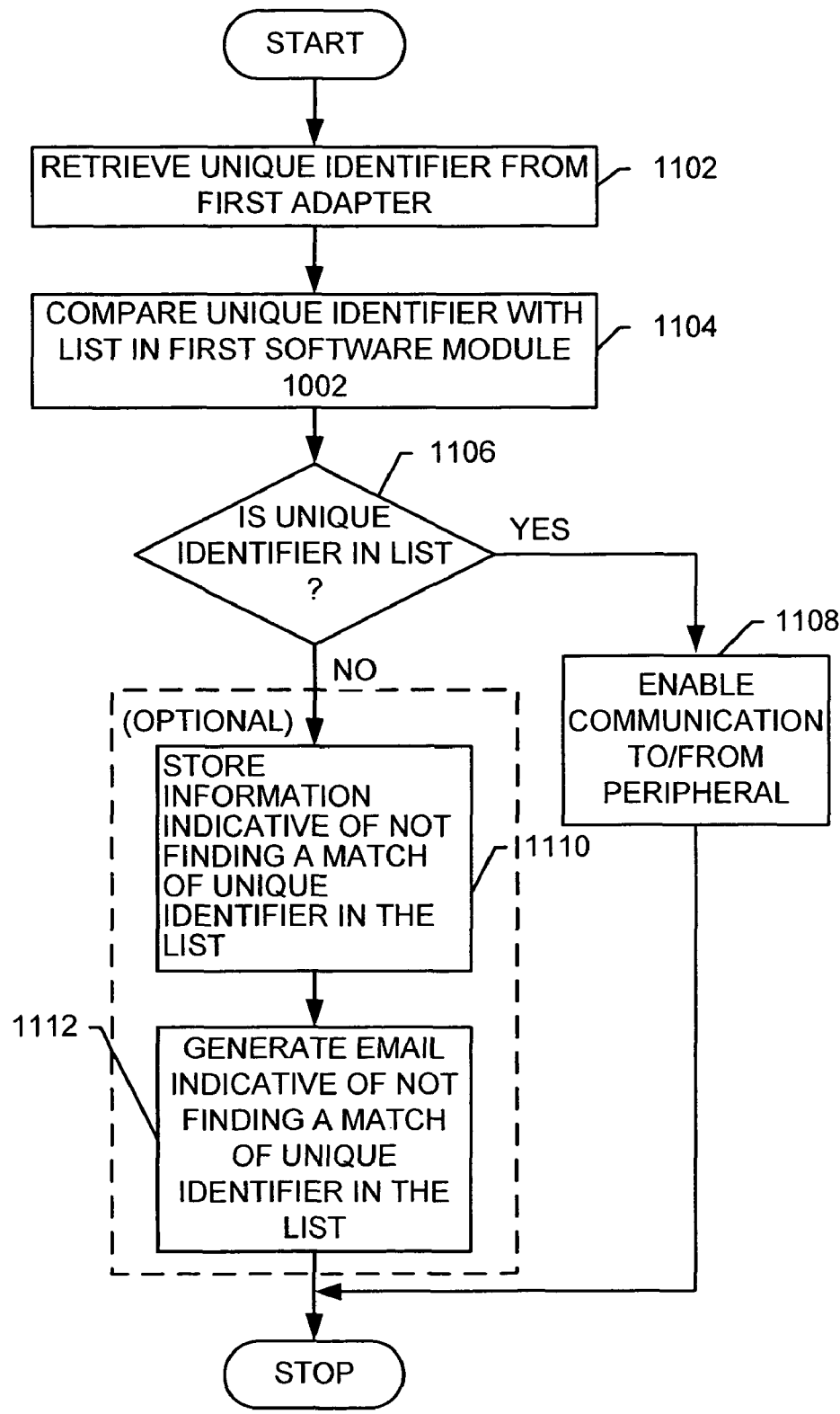
FIG. 11 is a flow chart of the actions performed by processor 802 as represented by the contents of second software module 1004.

FIG. 11 is a flow chart of the actions performed by processor 802 as represented by the contents of second software module 1004. At task 1102, processor 802 retrieves the contents of hardware 910 either upon:

(i) boot up of host computer 106;
(ii) attachment of peripheral 118 to network port 122; or,
(iii) attachment of peripheral 114 to host computer port 112.

At task 1104, processor 802 compares the unique identifier with a list of identifiers contained within first software module 1002.

At task 1106, processor 802 determines whether a match is found in the list.

If a match is found, at task 1108, processor 802 enables communication between software modules or processes residing either in memory 804 or other devices connected to network 102 and the peripheral in question (i.e., peripheral 114 or 118) via third software module 1006. Third software module 1006 by default disables communication with peripherals. If a match is not found, then optional tasks 1110 and 1112 are executed.

At task 1110, processor 802 stores information indicative of a failure to find a match of the retrieved unique identifier to elements in the list of software module 1002. This information can take the form of logging the attempt in memory 804, what identifier was retrieved, and supporting data for an investigation.

At task 1112, processor 802 generates an email indicative of a failure to find a match of the retrieved unique identifier retrieved to elements in the list of software module 1002. The email can be sent to the computer terminal of security officer if computer network 102 is a classified local area network, or to a system administrator.

Figure 12:
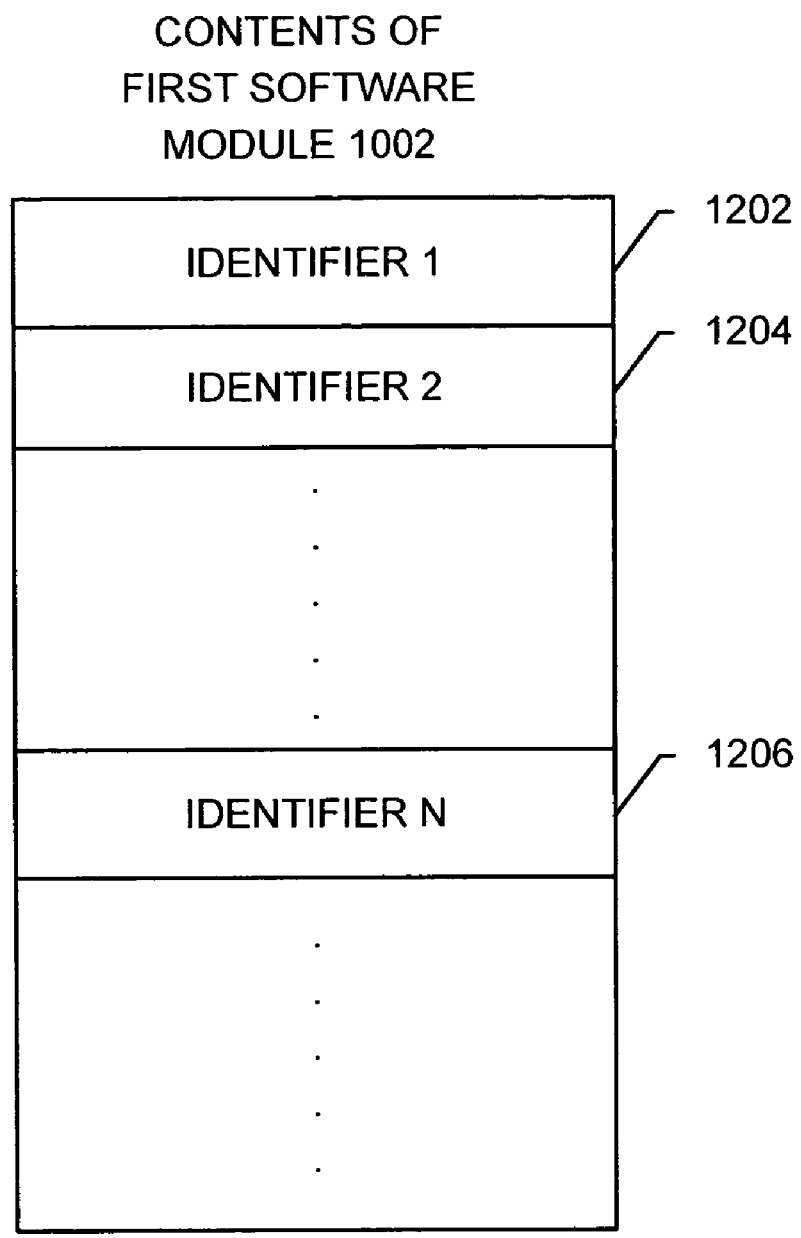
FIG. 12 depicts the contents of first software module 1002.

FIG. 12 depicts the contents of first software module 1002. First software module 1002 comprises a list of identifiers for peripherals that are authorized for use with processor 802 such as identifiers 1202, 1204, and 1206.

Figure 13:
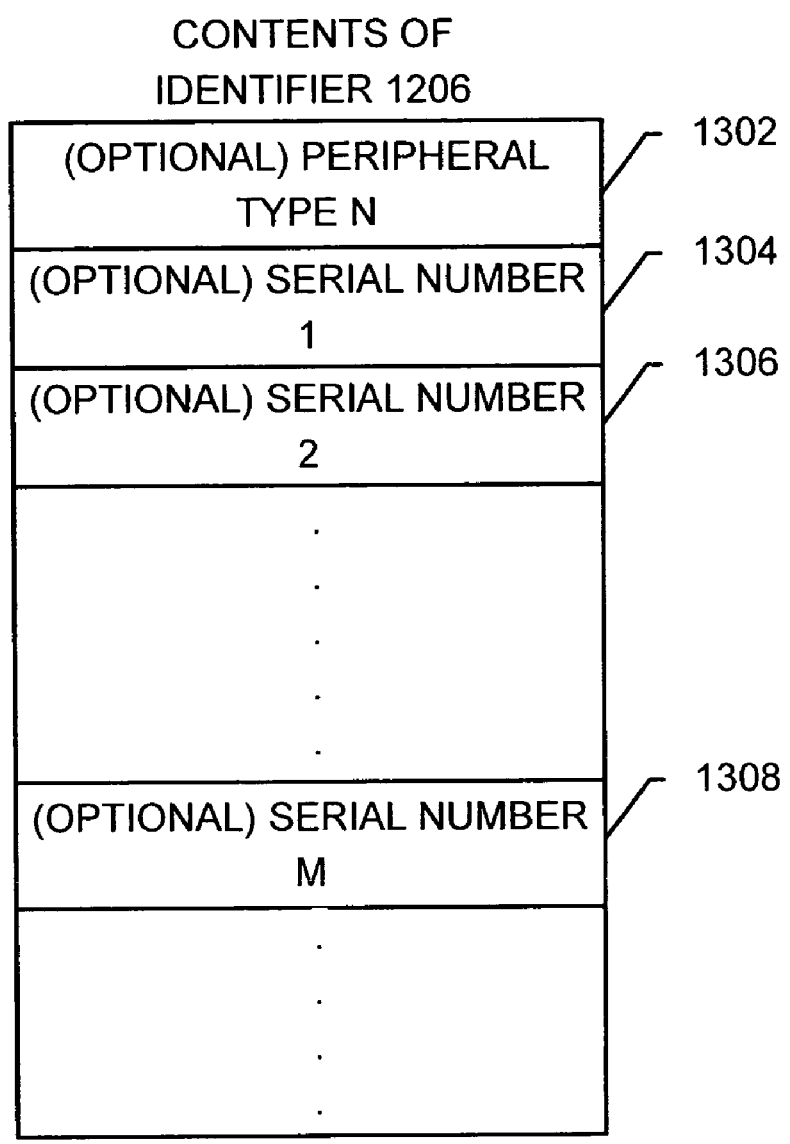
FIG. 13 depicts the contents of identifier 1206.

FIG. 13 depicts the contents of identifier 1206. Identifier 1206 can be indicative of peripheral type 1302 (e.g., a printer, I/O card, modem, etc.), along with a list of serial numbers 1304, 1306, and 1308 of peripherals that are allowed for use with processor 802 for given peripheral type 1302. It will be appreciated by those skilled in the art that identifier 1206 is not limited to the representation depicted in FIG. 13. How many elements identifier 1206 needs depends on the number of peripherals attached or could be attached to host computer 106 or computer network 102, the size of the network, or the needs of the company using the equipment. Some companies may require that each peripheral have a serial number, a serial number and peripheral type, a peripheral type, a single identifier for one computer or network or both, or one identifier for all products manufactured by the company.

Figure 14:
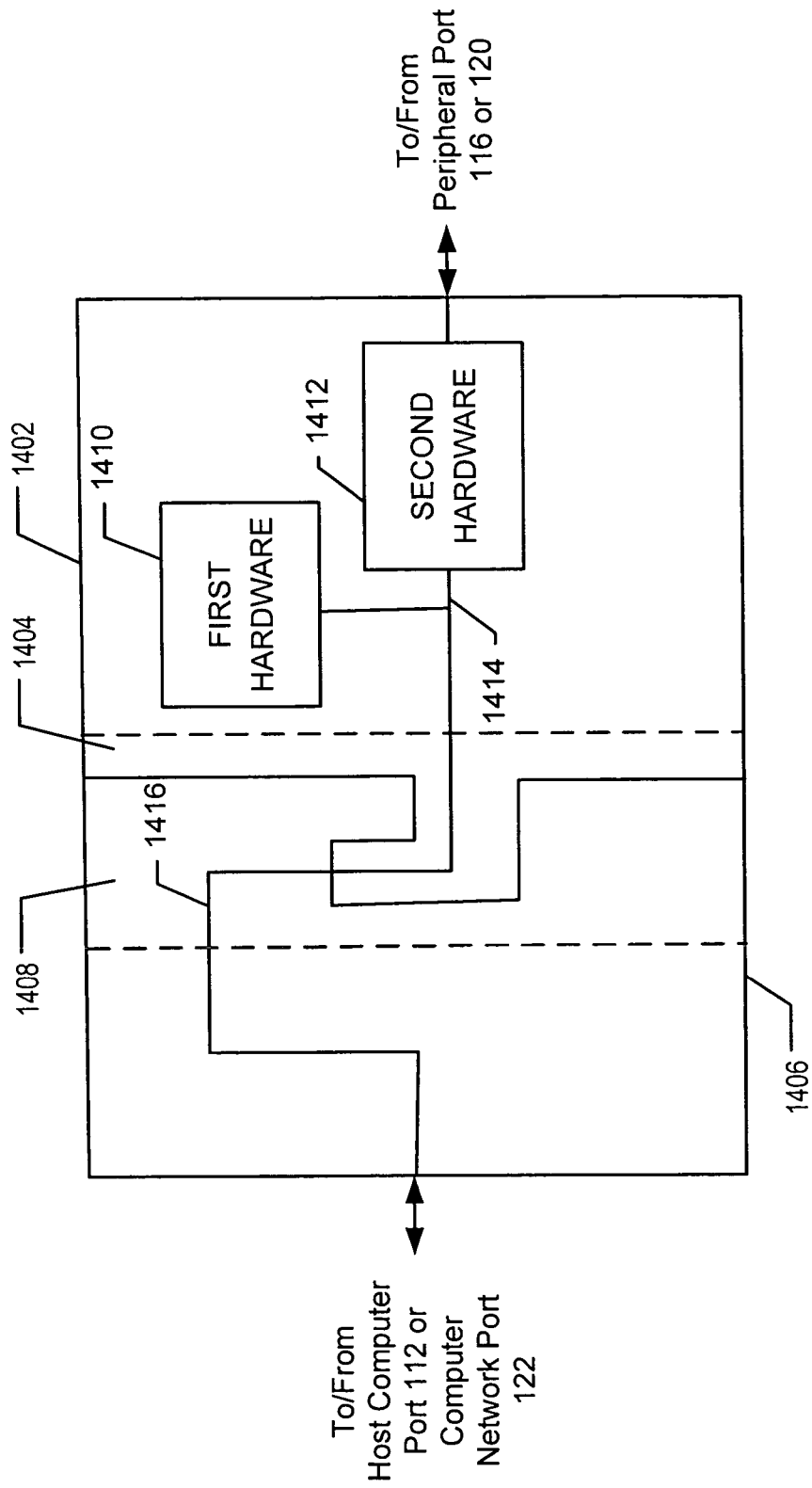
FIG. 14 depicts a block diagram of the third illustrative embodiment of the present invention.

FIG. 14 depicts a block diagram of the third illustrative embodiment of the present invention. Peripheral-side adapter 1402 contains first hardware 1410 for storing, via peripheral ports 116 or 120, a unique identifier of the peripheral with which the adapter is associated. First hardware 1410 comprises the same hardware as first hardware of FIG. 9. The unique identifier is the same as stored in first hardware 910 of FIG. 9.

Paths 1414 and 1416 provide the electrical connections between:

(i) peripheral port 116 and host computer port 112 or
(ii) peripheral port 120 and computer network port 122 via connectors 1404 and 1408. Path 1414 and 1416 permit processor 802 to access the contents of first hardware 1410. Inserted, however, in path 1414 of peripheral-side adapter 1402 is second hardware 1412. Second hardware 1412 provides, in hardware, the functionality described for third software module 1006. It comprises hardware that, by default, disables electrical communication between processor 802 and one of peripherals 114 and 118.

Second hardware 1412 is under the control of processor 802. Processor 802 retrieves the contents of first hardware 1410 either upon:

(i) boot up of host computer 106;
(ii) attachment of peripheral 118 to network port 122; or,
(iii) attachment of peripheral 114 to host computer port 112.

Processor 802 then compares the unique identifier with a list of identifiers of authorized peripherals. If a match is found, processor 802 sends commands to second hardware 1412 to permit electrical communication between one of processor 802 and network 102 and one of peripheral 114 and 118. Second hardware 1412 can comprise, for example, one or more normally-open relays, semiconductor switches, etc., and line-interrupt control. It will be appreciated by those skilled in the art how to make and use second hardware 1412.

Figure 15:
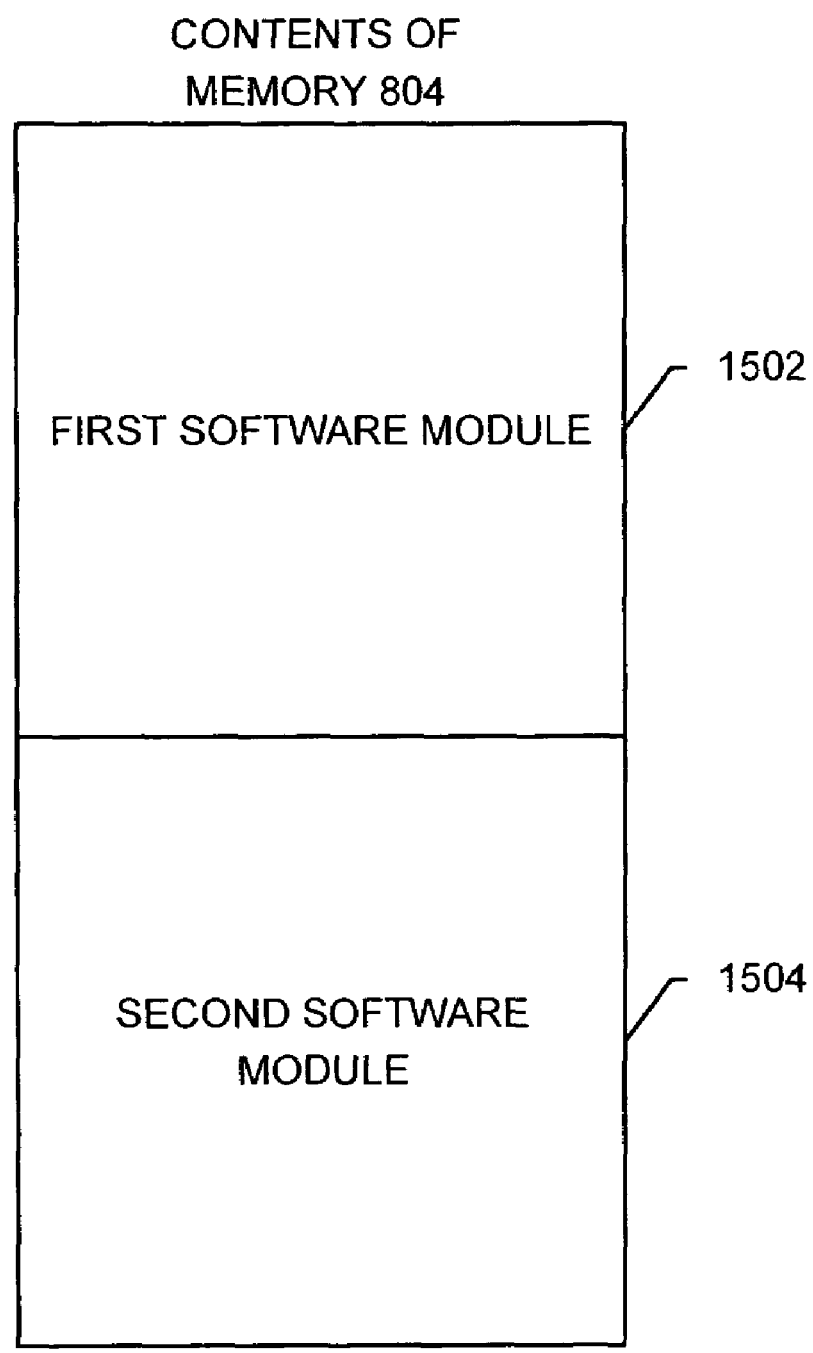
FIG. 15 depicts the contents of memory 804 for the third illustrative embodiment of the present invention.

FIG. 15 depicts the contents of memory 804 for the third illustrative embodiment of the present invention. In the third illustrative embodiment, memory 804 comprises first software module 1502 comprising a list of identifiers associated with peripherals that are authorized to be connected to host computer 106 or computer network 102; and second software module 1504 for retrieving the contents of first hardware 1410 and taking actions based upon said contents. In particular, the functionality provided by third software module 1006 of the first illustrative embodiment is replaced by the functionality of second hardware 1412. First software module 1502 has the same contents as first software module 1002 of the second illustrative embodiment.

Figure 16:
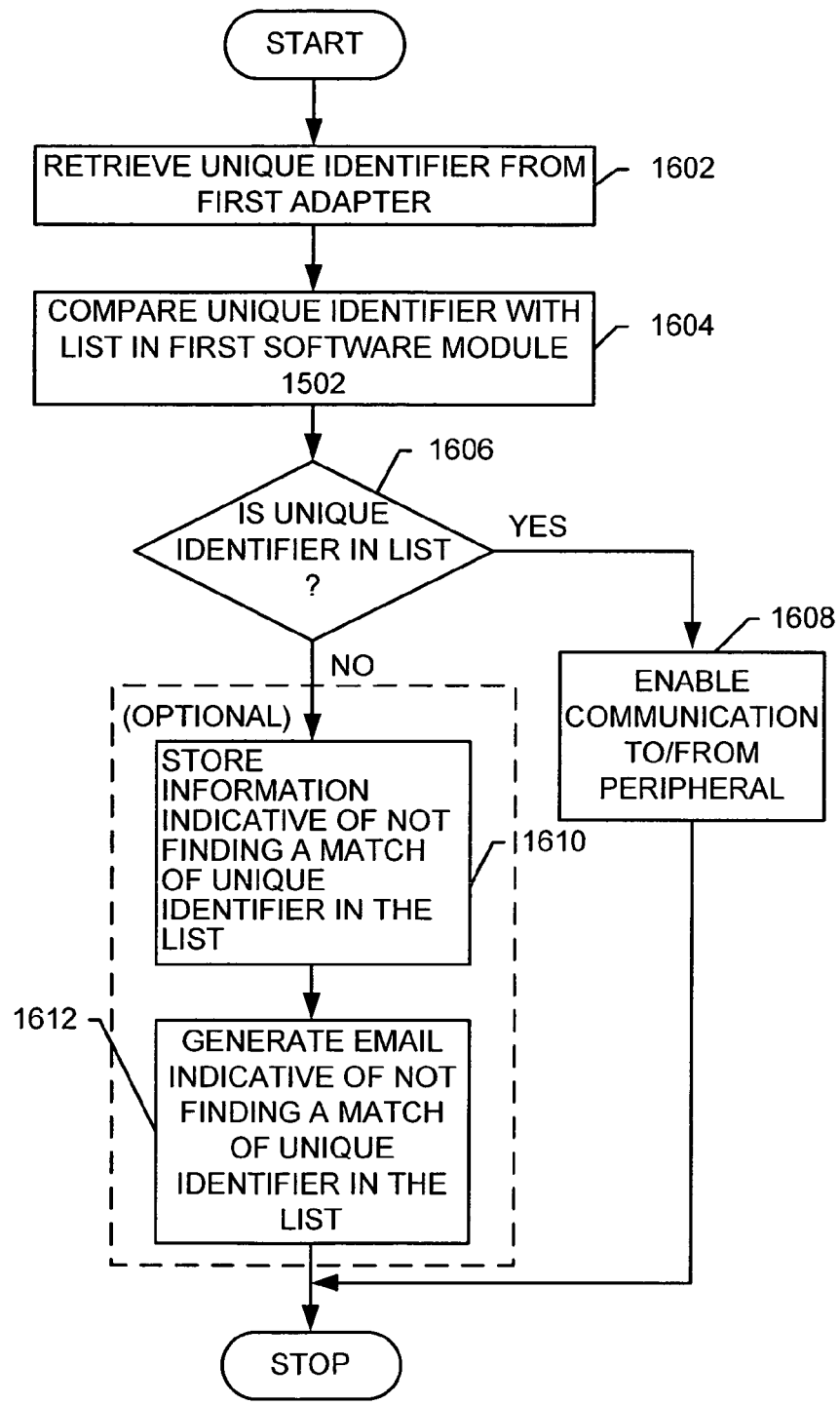
FIG. 16 is a flow chart of the actions taken by processor 802 as represented by the contents of second software module 1504.

FIG. 16 is a flowchart of the actions taken by processor 802 as represented by the contents of second software module 1504. At task 1602, processor 802 retrieves the contents of first hardware 1410 either upon:

(i) boot up of host computer 106;
(ii) attachment of peripheral 118 to network port 122; or,
(iii) attachment of peripheral 114 to host computer port 112.

At task 1604, processor 802 compares the unique identifier with a list of identifiers contained within a database of first software module 1502 stored in memory 804.

At task 1606, processor 802 decides whether a match is found in the list.

If a match is found, at task 1608, processor 802 enables communication between software modules or processes residing either in memory 804 or other devices connected to network 102 and the peripheral in question (i.e. either peripheral 114 or 118) via second hardware 1412. Second hardware 1412 by default disables communication with peripherals. Processor 802 sends commands directly to second hardware 1412 to enable communication. If a match is not found, then optional tasks 1610 and 1612 are executed.

At task 1610, processor 802 stores information indicative of a failure to find a match of the retrieved unique identifier to elements in the list of software module 1502. This information can take the form of logging the attempt in memory 804, what identifier was retrieved, and supporting data for an investigation.

At task 1612, processor 802 generates an email indicative of a failure to find a match of the retrieved unique identifier retrieved to elements in the list of software module 1602. The email can be sent to the computer terminal of security officer if computer network 102 is a classified local area network, or to a system administrator.

Figure 17:
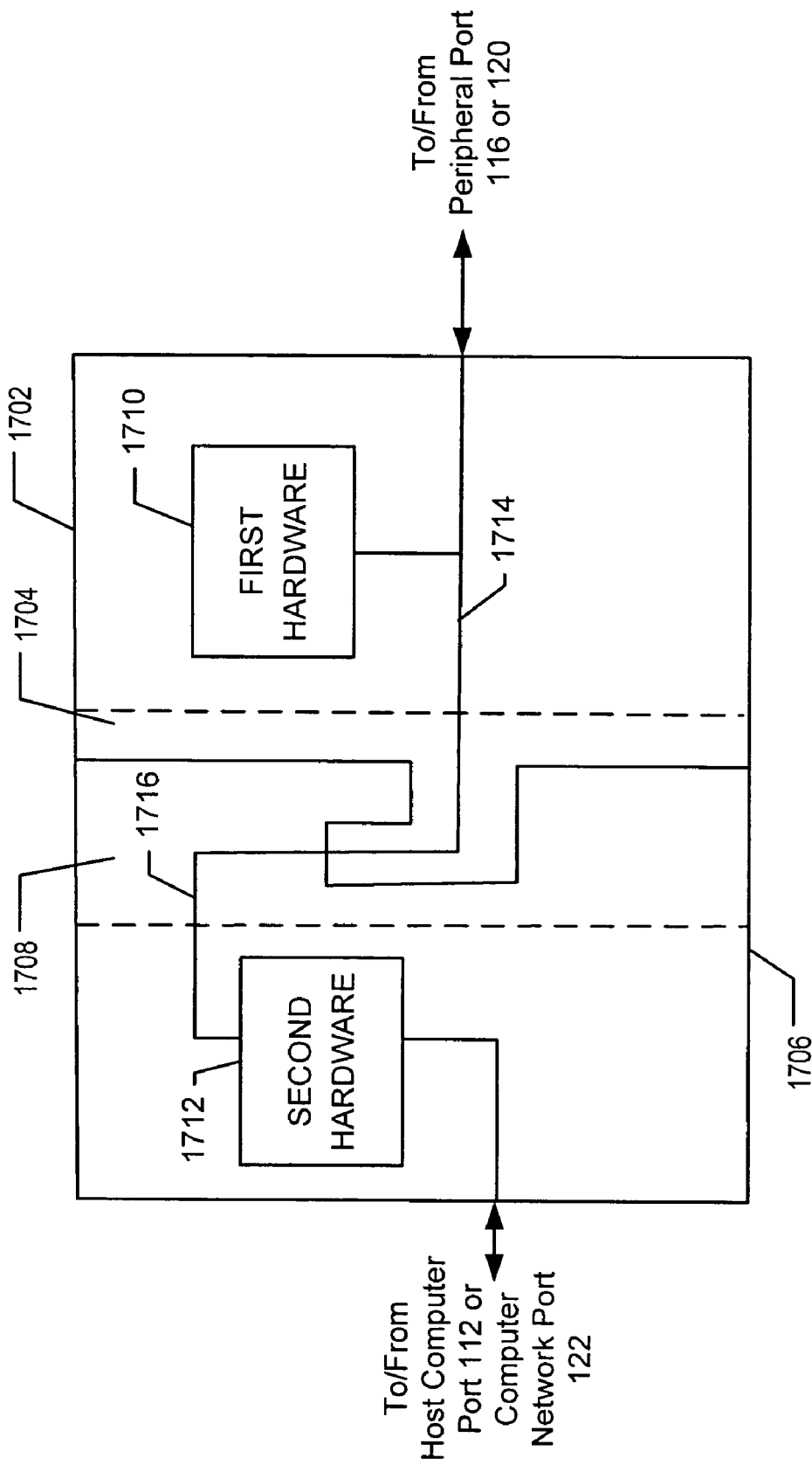
FIG. 17 depicts a block diagram of the fourth illustrative embodiment of the present invention.

FIG. 17 depicts a block diagram of the fourth illustrative embodiment of the present invention. Peripheral-side adapter 1702 contains first hardware 1710 for storing, via peripheral ports 116 or 120, a unique identifier for the peripheral with which adapter is associated. First hardware 1710 comprises the same hardware as first hardware of FIG. 9. The unique identifier is the same as stored in first hardware 910 of FIG. 9.

Paths 1714 and 1716 provide the electrical connections between:

(i) peripheral port 116 and host computer port 112 or (ii) peripheral port 120 and computer network port 122 via connectors 1704 and 1708, respectively. Path 1714 and 1716 permit processor 802 to access the contents of first hardware 1710. Inserted, however, in path 1716 of network/host computer-side adapter 1706 is second hardware 1712. Second hardware 1412 disables communication to/from peripheral 114 or 118. It comprises hardware that, by default, enables electrical communication between processor 802 and one of peripherals 114 and 118.

Second hardware 1712 is under the control of processor 802. Processor 802 retrieves the contents of first hardware 1710 either upon:

(i) boot up of host computer 106;

(ii) attachment of peripheral 118 to network port 122; or, (iii) attachment of peripheral 114 to host computer port 112.

Processor 802 then compares the unique identifier with a list of identifiers of authorized peripherals. If a match is not found, processor 802 sends commands to second hardware 1712 to disable electrical communication between one of processor 802 and network 102 and one of peripheral 114 and 118. Second hardware 1412 can comprise, for example, one or more normally-closed relays, semiconductor switches, etc., and line-interrupt control. It will be appreciated by those skilled in the art how to make and use second hardware 1712.

Figure 18:
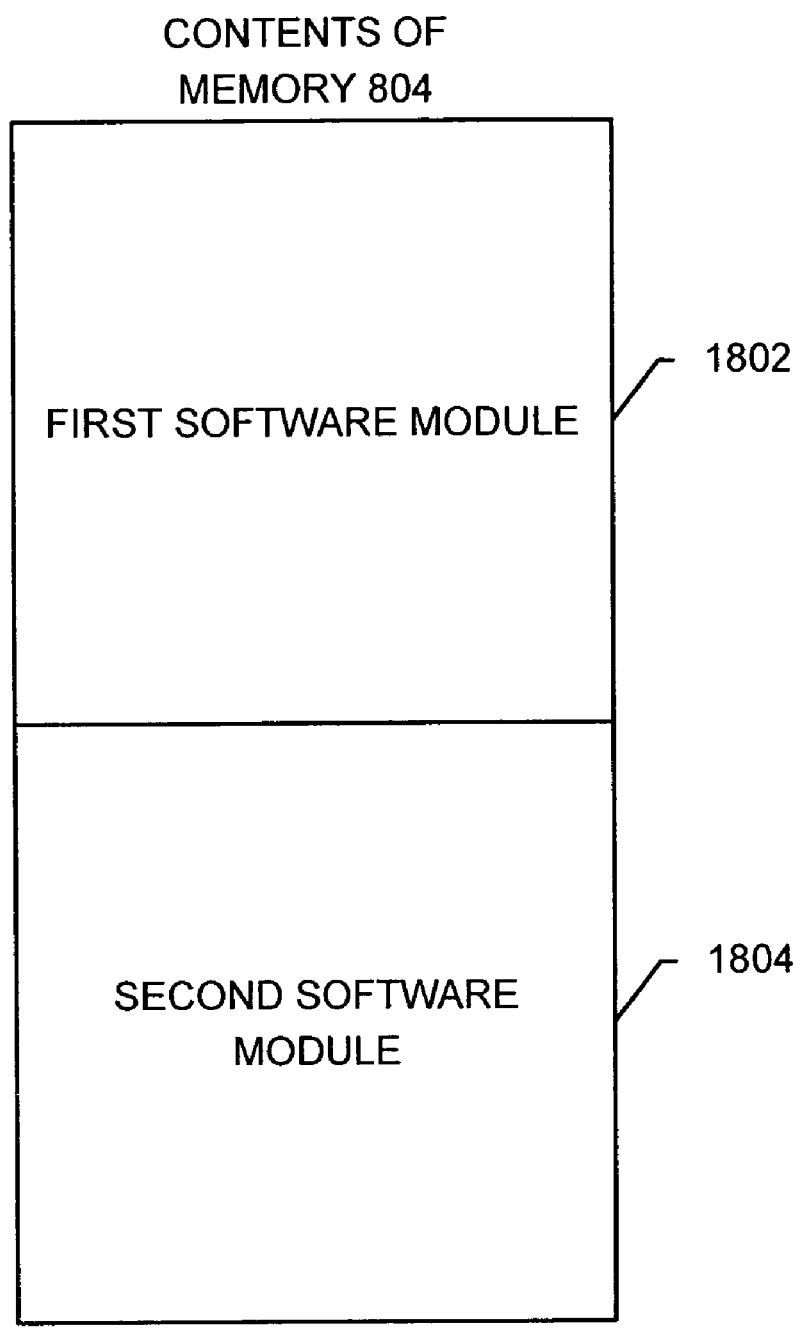
FIG. 18 depicts the contents of memory 804 for the fourth illustrative embodiment of the present invention.

FIG. 18 depicts the contents of memory 804 of the fourth illustrative embodiment of the present invention. In the second illustrative embodiment, memory 804 comprises first software module 1802 comprising a list of identifiers associated with peripherals that are authorized to be connected to host computer 106 or computer network 102; and second software module 1804 for retrieving the contents of first hardware 1410 and taking actions based upon said contents. First software module 1802 has the same contents as first software module 1002 of the first illustrative embodiment.

Figure 19:
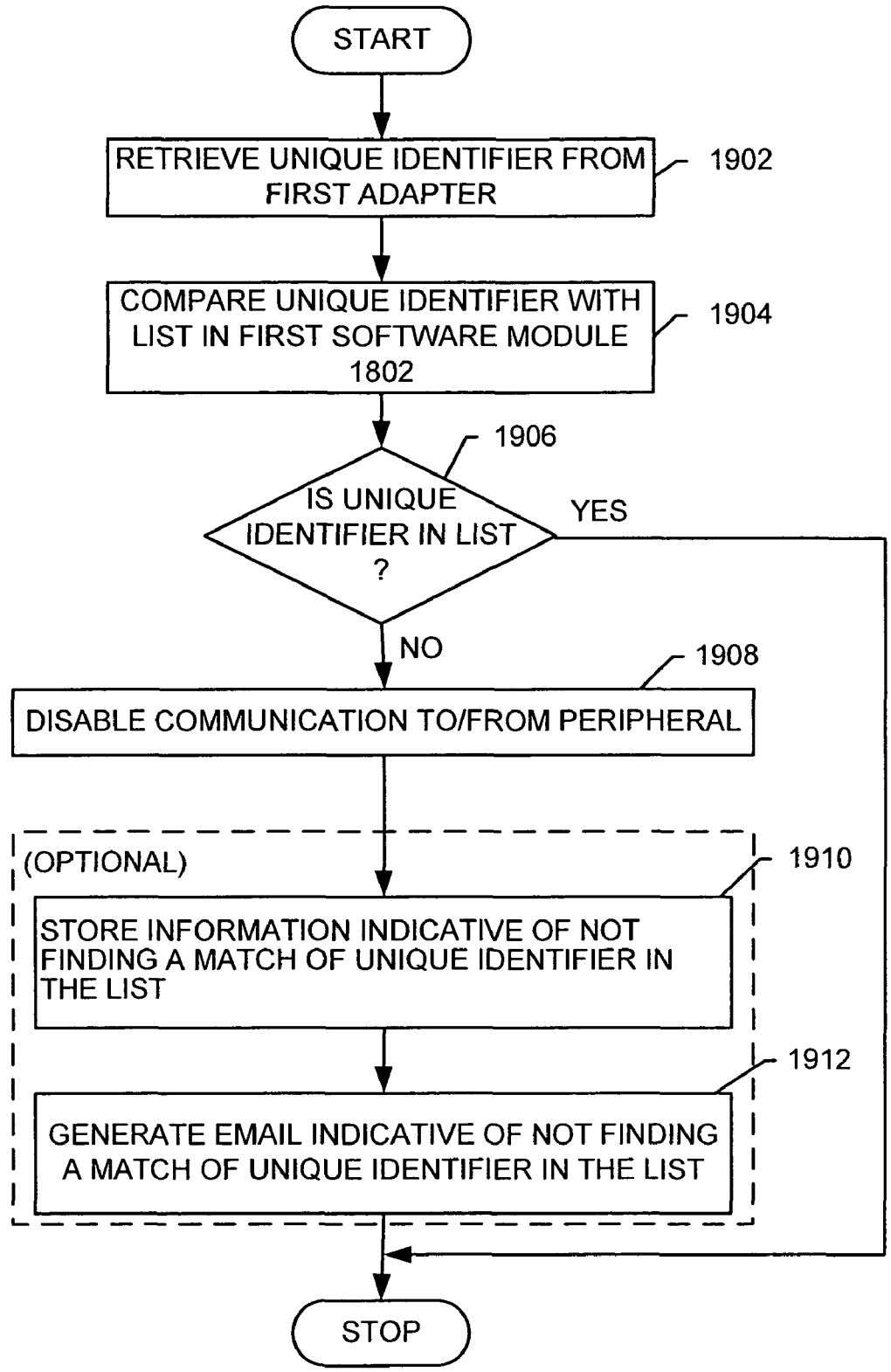
FIG. 19 is a flow chart of the actions taken by processor 802 as represented by the contents of second software module 1804.

FIG. 19 is a flowchart of the actions taken by processor 802 as represented by the contents of second software module 1804. At task 1902, processor 802 retrieves the contents of first hardware 1710 either upon:

(i) boot up of host computer 106;

(ii) the attachment of peripheral 118 to network port 122; or (iii) the attachment of peripheral 114 to host computer port 112.

At task 1904, processor 802 compares the unique identifier with a list of identifiers contained within software module 1802.

At task 1906, processor 802 decides whether a match is found in the list.

If a match is found, no action is taken (second hardware 1712 by default enables communication with peripherals). If a match is not found, at task 1908, processor 802 sends commands directly to second hardware 1712 to disable communication. Optionally, tasks 1910 and 1912 are executed.

At task 1910, processor 802 stores information indicative of a failure to find a match of the retrieved unique identifier to elements in the list of software module 1802. This information can take the form of logging the attempt in memory 804, what identifier was retrieved, and supporting data for an investigation.

At task 1912, processor 802 generates an email indicative of a failure to find a match of the retrieved unique identifier retrieved to elements in the list of software module 1902. The email can be sent to the computer terminal of security officer if computer network 102 is a classified local area network, or to a system administrator.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

What is claimed is:

1. An apparatus comprising:
   a first adapter, wherein said first adapter contains hardware for storing a unique identifier;
   a second adapter, wherein said first adapter couples a first port associated with a computer peripheral to said second adapter, and wherein said second adapter couples said first adapter to a second port associated with a processor;
   a first software module associated with said processor, wherein said first software module consults a list of identifiers within said first software module and wherein each of said identifiers is associated with a respective computer peripheral authorized for use with said processor; and
   means for enabling communication to and from said computer peripheral under control of said processor, and
   wherein said first adapter is destroyed when removed from said computer peripheral.

2. The apparatus of claim 1 wherein said unique identifier comprises at least one of either a serial number or a peripheral type.

3. An apparatus comprising:
   a first adapter, wherein said first adapter contains hardware for storing a unique identifier;
   a second adapter, wherein said first adapter couples a first port associated with a computer peripheral to said second adapter, and wherein said second adapter couples said first adapter to a second port associated with a processor, and further wherein said first adapter comprises a first keyed-connector and said second adapter comprises a second keyed-connector, and wherein said first keyed-connector and said second-keyed connector are keyed to each other;
   a first software module associated with said processor, wherein said first software module consults a list of identifiers within said first software module and wherein each of said identifiers is associated with a respective computer peripheral authorized for use with said processor; and
   means for enabling communication to and from said computer peripheral under control of said processor.

4. The apparatus of claim 2 wherein said first keyed-connector is chosen from the group consisting of a tamper-proof seal, a screw head, and a physical key.

5. The apparatus of claim 2 wherein said unique identifier comprises a serial number.

6. The apparatus of claim 2 wherein said unique identifier comprises a peripheral type.

7. An apparatus comprising:
a first adapter, wherein said first adapter contains hardware for storing a unique identifier;
a second adapter, wherein said first adapter couples a first port associated with a computer peripheral to said second adapter, and wherein said second adapter couples said first adapter to a second port associated with a processor, and wherein said first adapter and said second adapter are physically connected to one another;
a first software module associated with said processor, wherein said first software module consults a list of identifiers within said first software module and wherein each of said identifiers is associated with a respective computer peripheral authorized for use with said processor;
means for enabling communication to and from said computer peripheral under control of said processor, and
a second software module associated with said processor, wherein said second software module:
retrieves said unique identifier from said first adapter;
compares said unique identifier with said list; and
enables said communication if a match of said unique identifier is found in said list.

8. An apparatus comprising:
a first adapter, wherein said first adapter contains hardware for storing a unique identifier;
a second adapter, wherein said first adapter couples a first port associated with a computer peripheral to said second adapter, and wherein said second adapter couples said first adapter to a second port associated with a processor;
a first software module associated with said processor, wherein said first software module consults a list of identifiers within said first software module and wherein each of said identifiers is associated with a respective computer peripheral authorized for use with said processor;
means for enabling communication to and from said computer peripheral under control of said processor, and
a second software module associated with said processor, wherein said second software module:
retrieves said unique identifier from said first adapter;
compares said unique identifier with said list;
enables said communication if a match of said unique identifier is found in said list;
stores information indicative of not finding a match of said unique identifier in said list; and
generates an email indicative of not finding a match of said unique identifier in said list.

9. The apparatus of claim 8 wherein said second software module also disables said communication if a match of said identifier is not found in said list.

10. An apparatus comprising:
a computer peripheral comprising a first port;
a host computer comprising a second port;
a computer network comprising a third port and a fourth port, wherein said third port is coupled to said second port;
a first adapter, wherein said first adapter contains a first hardware for storing a unique identifier;
said first hardware;
a second adapter, wherein said first adapter couples said first port to said second adapter, and wherein said second adapter couples said first adapter to said fourth port, and wherein said first adapter and said second adapter are physically connected to one another;
a first software module associated with said host computer, wherein said first software module consults a list of identifiers within said first software module and wherein each of said identifiers is associated with a respective computer peripheral authorized for use with said host computer; and
a second hardware for enabling communication to and from said computer peripheral under the control of said host computer.

11. The apparatus of claim 10 wherein said second hardware is contained within said first adapter.

12. The apparatus of claim 10 wherein said first adapter comprises a first keyed-connector and said second adapter comprises a second keyed-connector, and wherein said first keyed-connector and said second-keyed connector are keyed to each other.

13. The apparatus of claim 12 wherein said first keyed-connector is chosen from the group consisting of a tamper-proof seal, a screw head, and a physical key.

14. The apparatus of claim 10 wherein said unique identifier comprises a peripheral type.

15. The apparatus of claim 10 further comprising a second software module associated with said host computer, wherein said second software module:
retrieves said unique identifier from said first adapter;
compares said unique identifier with said list; and
enables said communication if a match of said unique identifier is found in said list.

16. The apparatus of claim 15 wherein said second software module also:
stores information indicative of not finding a match of said unique identifier in said list; and
generates an email indicative of not finding a match of said unique identifier in said list.

17. The apparatus of claim 16 wherein said second software module disables said communication if a match of said identifier is not found in said list.

18. An apparatus comprising:
a computer peripheral comprising a first port;
a host computer comprising a second port;
a computer network comprising a third port and a fourth port, wherein said third port is coupled to said second port;
a first adapter, wherein said first adapter contains a first hardware for storing a unique identifier;
said first hardware;
a second adapter, wherein said first adapter couples said first port to said second adapter, and wherein said second adapter couples said first adapter to said fourth port;
a first software module associated with said host computer, wherein said first software module consults a list of identifiers within said first software module and wherein each of said identifiers is associated with a respective computer peripheral authorized for use with said host computer; and
a second hardware for enabling communication to and from said computer peripheral under the control of said host computer, wherein said second hardware is contained within said second adapter.

19. The apparatus of claim 18 wherein said first adapter is destroyed when removed from said computer peripheral.

20. The apparatus of claim 18 wherein said unique identifier comprises a serial number.

21. An apparatus comprising:
a computer peripheral comprising a first port;

a host computer comprising a second port;

a first adapter, wherein said first adapter contains a first hardware for storing a unique identifier;

said first hardware;

a second adapter, wherein said first adapter couples said first port to said second adapter, and wherein said second adapter couples said first adapter to said second port, and wherein said first adapter and said second adapter are physically connected to one another;

a first software module associated with said host computer, wherein said first software module consults a list of identifiers within said first software module and wherein each of said identifiers is associated with a respective computer peripheral authorized for use with said host computer; and a second hardware for enabling communication to and from said computer peripheral under the control of said host computer, wherein said second hardware is contained within one of said first adapter or said second adapter.

22. The apparatus of claim 21 wherein said first adapter comprises a first keyed-connector and said second adapter comprises a second keyed-connector, and wherein said first keyed-connector and said second-keyed connector are keyed to each other.

23. The apparatus of claim 22 wherein said first keyed-connector is chosen from the group consisting of a tamper-proof seal, a screw head, and a physical key.

24. The apparatus of claim 21 wherein said unique identifier comprises a serial number.

25. The apparatus of claim 21 wherein said unique identifier comprises a peripheral type.

26. The apparatus of claim 21 further comprising a second software module associated with said host computer, wherein said second software module:

retrieves said unique identifier from said first adapter;

compares said unique identifier with said list; and enables said communication if a match of said unique identifier is found in said list.

27. The apparatus of claim 26 wherein said second software module also:

stores information indicative of not finding a match of said unique identifier in said list; and generates an email indicative of not finding a match of said unique identifier in said list.

28. The apparatus of claim 27 wherein said second software module also disables said communication if a match of said identifier is not found in said list.

29. An apparatus comprising:

a computer peripheral comprising a first port;

a host computer comprising a second port;

a first adapter, wherein said first adapter contains a first hardware for storing a unique identifier, and further wherein said first adapter is destroyed when removed from said computer peripheral;

said first hardware;

a second adapter, wherein said first adapter couples said first port to said second adapter, and wherein said second adapter couples said first adapter to said second port;

a first software module associated with said host computer, wherein said first software module consults a list of identifiers within said first software module and wherein each of said identifiers is associated with a respective computer peripheral authorized for use with said host computer; and a second hardware for enabling communication to and from said computer peripheral under the control of said host computer, wherein said second hardware is contained within one of said first adapter or said second adapter.

* * * * *